United States Patent [19]

Shaw

[11] Patent Number: 4,743,320
[45] Date of Patent: May 10, 1988

[54] METHOD OF HEAT SEALING A THERMOPLASTIC DRUM AND LID AND ARTICLE OF MANUFACTURE

[75] Inventor: Mark D. Shaw, Ponte Vedra Beach, Fla.

[73] Assignee: Bondico, Inc., Jacksonville, Fla.

[21] Appl. No.: 795,227

[22] Filed: Nov. 5, 1985

Related U.S. Application Data

[63] Continuation-in-part of Ser. No. 638,556, Aug. 7, 1984, Pat. No. 4,586,624.

[51] Int. Cl.$^4$ ............................................. B65B 7/28
[52] U.S. Cl. .................................. 156/69; 156/273.9; 156/274.2; 156/306.6; 264/27; 264/248
[58] Field of Search ............... 220/359; 156/69, 273.9, 156/306.6; 264/27, 248; 156/293, 274.2

[56] References Cited

U.S. PATENT DOCUMENTS

| | | | |
|---|---|---|---|
| 2,744,655 | 5/1956 | Vnuk | 156/273.9 |
| 3,133,846 | 5/1964 | Gandy | 156/273.9 |
| 3,506,519 | 4/1970 | Blumenkranz | 156/273.9 |
| 3,561,982 | 2/1971 | Oeth | 220/359 |
| 4,201,306 | 5/1980 | Dubois | 156/69 |
| 4,586,624 | 5/1986 | Shaw | 264/27 |

Primary Examiner—Donald E. Czaja
Assistant Examiner—Merrell C. Cashion, Jr.
Attorney, Agent, or Firm—Wigman & Cohen

[57] ABSTRACT

A method of heat sealing a thermoplastic lid to a thermoplastic drum and an article of manufacture comprising a sealed container especially for hazardous and nuclear wastes are disclosed. A pair of flat ribbon resistance wires are encapsulated within a thermoplastic sheath and are arranged in spaced, parallel, substantially coplanar relation. For welding together the drum and lid, one or more pairs of encapsulated wires are attached to the lid and are compressed between confronting surfaces of the lid and drum by mean of a drum clamp. A predetermined electric current is passed through the wires to heat the wires and melt the thermoplastic sheath. As the thermoplastic sheath melts, the pressure exerted by the drum clamp squeezes the molten thermoplastic material radially inwardly and outwardly along the confronting surfaces of the lid and drum. The heated wires are urged into contact with the thermoplastic material of the drum and lid which is melted and intermingled to thereby weld the lid and drum together and form a sealed container.

20 Claims, 1 Drawing Sheet

METHOD OF HEAT SEALING A THERMOPLASTIC DRUM AND LID AND ARTICLE OF MANUFACTURE

CROSS REFERENCE TO RELATED APPLICATION

This application is a continuation-in-part of U.S. Patent Application Ser. No. 638,556 filed Aug. 7, 1984, now U.S. Pat. No. 4,586,624.

BACKGROUND OF THE INVENTION

The present invention relates to heat sealing thermoplastic materials together, and in particular to a method of heat sealing a thermoplastic lid to a thermoplastic drum designed for the disposal of hazardous and nuclear wastes and to an article of manufacture comprising a sealed container.

A search of the prior art failed to uncover any prior art references which disclose the method or article of manufacture of the present invention. A number of patents were uncovered which disclose methods or devices for heat sealing or bonding methods in general.

U.S. Pat. No. 4,349,219 discloses a welding muff of thermoplastic material which forms a sleeve around two pipe parts that are to be joined. A resistance wire within the muff welds the interior surface of the muff to the exterior surfaces of the pipe parts.

U.S. Pat. No. 4,029,837 discloses a composite plastic-metallic bonding means and method comprising a metallic mesh interposed between first and second layers which are inserted between first and second bodies. The metal mesh is heated by exposing it to an alternating magnetic field. The heated mesh melts layers and forms a seal between the first and second bodies.

U.S. Pat. No. 2,961,363 discloses a method for coupling thermoplastic components comprising a hollow ring of an exothermic autocombustible substance which is placed between the two thermoplastic components to be coupled. Ignition of the exothermic autocombustible substance heats the thermoplastic components and welds them together.

U.S. Pat. No. 4,106,969 discloses a method of joining a thermoplastic material to an inorganic material comprising heating a helical coil and partially embedding it in the thermoplastic material and then gluing the inorganic material to the thermoplastic material using the helical coil as an anchor for the adhesive.

Because of inherent structural limitations or flammability problems, the above methods and devices are not suitable for welding thermoplastic materials or for sealing and storing hazardous waste materials.

In addition to the aforementioned prior art methods and devices, the following patents were cited by the Examiner in the aforesaid copending application, Ser. No. 638,556, now U.S. Pat. No. 4,586,624.

| U.S. Pat. No. | U.S. Pat. No. |
| --- | --- |
| 2,274,839 | 3,305,668 |
| 2,741,402 | 3,348,640 |
| 2,744,655 | 3,852,570 |
| 2,795,348 | 4,110,145 |
| 2,802,593 | 4,436,488 |
| 3,079,458 | 4,470,193 |
| 3,084,242 | 4,493,985 |
| 3,095,112 | |

The above-listed patents cited by the Examiner do not disclose the heat sealing method and article of manufacture of the present invention.

In recent times, the disposal of hazardous waste material has become a significant problem. Nearly 270 million tons of hazardous waste material is generated each year. Presently, the waste material is typically disposed of by placing it in either a metallic or plastic container. The metallic containers are unsuitable because they are subject to corrosion and leakage when exposed to the elements for a period of time.

The disposal of low level radioactive wastes is also a public and industry concern. Government regulations require disposal containers to have a 300-year design life and must have a positive seal of equal integrity.

To avoid the corrosion problems associated with metal containers, hazardous waste materials, such as solid hazardous wastes in bulk or particulate form, dewatered hazardous sludges, or hazardous wastes that have been stabilized through solidification/cementation processes, are frequently stored in plastic containers. The presently used plastic containers are closed by a conventional metal clamp holding the lid to the drum. It has been suggested that waste material originally placed in a metal container may then be placed in a plastic container.

It has also been suggested to heat seal plastic drums by suspending a heating plate between the plastic drum and a plastic lid that is suspended above the heating plate. When the top of the drum and the bottom of the lid reach a predetermined temperature, the plate is removed and the lid is pressed onto the drum to complete the seal.

Both methods for sealing the plastic containers are disadvantageous. The metal clamp is prone to corrosion or rusting and the heating plate method is awkward to use and requires expensive capital equipment.

SUMMARY AND OBJECTS OF THE INVENTION

In view of the foregoing limitations and shortcomings of the prior art, as well as other disadvantages not specifically mentioned above, it should be apparent that there still exists a need in the art for an efficient and effective means for heat sealing thermoplastic lids to thermoplastic drums. It is, therefore, a primary objective of this invention to fulfill that need by providing an economical method for heat sealing a thermoplastic drum and lid together with maximum security and efficiency and a sealed container as an article of manufacture.

More particularly, it is an object of this invention to provide a resistance wire device for heat sealing a thermoplastic drum and lid together using a minimal amount of expensive capital equipment to form an article of manufacture.

A further object of the present invention is to provide a means for heat sealing a thermoplastic drum and lid together with a resistance wire, wherein shifting of the wire during the heating sealing process is prevented.

It is yet another object of the invention to provide a system for heat sealing thermoplastic drums that results in a weld of consistent quality between the thermoplastic material of the drum and lid.

It is a further object to provide a low cost method of converting a salvage drum to an article of manufacture comprising an encapsulate drum.

It is still another object of the invention to provide a heat sealing device for a thermoplastic drum and lid comprising a pair of flat ribbon resistance wires encapsulated in a thermoplastic sheath in such a manner that the wires remain positioned in fixed relation to each other until the sheath is melted so as to permit the wires to heat and weld together the adjacent material of the drum and lid with maximum thermal efficiency.

A further object of the present invention is to provide a means for heat sealing a lid to a drum wherein the heat sealing means is attached to the drum lid and remains in situ after sealing to form a sealed container article of manufacture.

It is yet another object of the present invention to provide a means for heat sealing a lid to a drum wherein the heating means is sealingly isolated from the contents of the drum.

Another object of the invention is to provide a method of heat sealing a thermoplastic drum and lid together by locating one or more flat ribbon, plastic encapsulated resistance wires between the drum and lid and applying an electric current to the resistance wires while simultaneously pressing the drum and lid together to squeeze the plastic encapsulate from around the wires and weld the drum and lid together over a substantial area of contact.

Another object of the invention is to provide a method of heat sealing which can be performed on-site with the use of a portable generator.

Yet another object of the invention is to provide a method of heat sealing that is simple and eliminates the need for skilled personnel to practice the method.

Briefly described, the aforementioned objects are accomplished according to the invention by providing a pair of flat ribbon resistance wires within a thermoplastic sheath. The flat wires have a width substantially greater than the thickness thereof. The wires are arranged in side-by-side, in substantially coplanar relation to each other in a manner designed to emit heat to the surrounding thermoplastic sheath with maximum thermal efficiency.

To weld together a thermoplastic drum and lid, one or more pairs of encapsulated wires are disposed between and in firm contact with the drum and lid to be joined. Pressure is applied by a drum clamp to compress the thermoplastic sheath and a predetermined electric current is passed through the wires until enough heat has been generated to soften and melt the thermoplastic sheath and weld or thermally bond the thermoplastic drum and lid together.

A further aspect of the present invention involves the application of the encapsulated resistance wires in a process for heat sealing thermoplastic lids to thermoplastic drums. In particular, the encapsulated wires are disposed in an annular ring and fastened to the lower surface of a thermoplastic drum lid adjacent the outer perimeter thereof by heating or other means. An annular seal, such as an O-ring is placed inwardly of the annular sheath to prevent flammable gases or materials within the drum from contacting the area to be welded.

The drum lid is clamped to the upper lip or flange of a thermoplastic drum by means of a drum clamp with the encapsulated wires and O-ring disposed therebetween. The drum clamp engages beveled surfaces on the lip and drum so that as the clamp is tightened the lid is urged toward the drum flange to place the thermoplastic sheath under compression. An electric current is then passed through the wires for a period of time sufficient to heat up the wires, melt the thermoplastic sheath so that the resistance wires are substantially contacting the material of the lid and drum and thereby weld the lid to the drum. The wires are then disconnected from the electric current and the sealed drum is ready for disposal.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
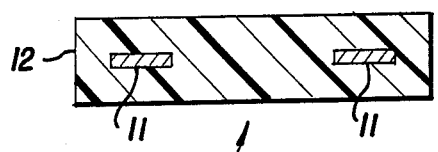
FIG. 1 is a cross-sectional view of the heat sealing device of the invention with resistance wires encased in a plastic sheath.

Referring now in detail to the drawings wherein like parts are designated by like reference numerals throughout, there is illustrated in FIG. 1 a cross-sectional view of the heat sealing device of the present invention which is designated by reference numeral 10. The device 10 comprises a pair of flat ribbon resistance wires 11 encased in a thermoplastic sheath 12.

The wires 11 have a width substantially greater than the thickness thereof. In one preferred form, the wires are about 0.0625 inches wide and 0.0045 inches thick. The wires are preferably made from nickel-chromium and have a resistance of approximately 2 ohms per linear foot.

Figure 4:
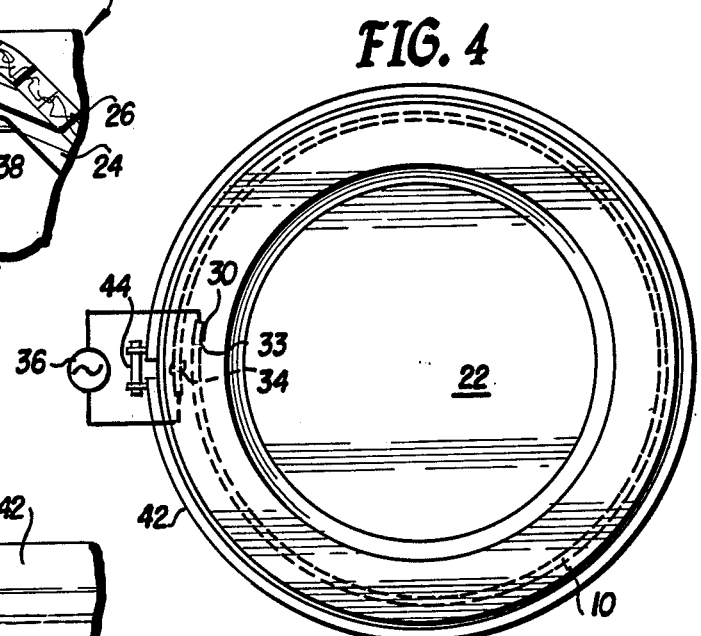
FIG. 4 is a top plan view of the lid clamped to a drum.

The sheath 12 may be made of any suitable thermoplastic material, preferably polyethylene. The device 10 may be formed by drawing the ribbon wires 11 in spaced, parallel relation through a specially designed extruder die wherein molten polyethylene is extruded around the wires to form the sheath. For some applications, such as sealing plastic drums, it may be advantageous to draw the sheath and wires so that the heat sealing device 10 is arcuate or circular in shape, as is shown in FIG. 4.

The heat sealing device 10 may also be fabricated by rolling a pair of flat ribbon resistance wires between a pair of thin strips of polyethylene which have been heated sufficiently to weld the strips of polyethylene together around the wires and thereby encapsulate the wires. Whether the heat sealing device is fabricated by extrusion, rolling or any other process, the ribbon wires are preferably arranged in side-by-side, substantially coplanar relation to one another, as can be seen in FIG. 1, and are preferably spaced apart 2 to 3 times the width of the wire for maximum thermal efficiency. It is also possible to form the heat sealing device of the invention with only one flat resistance wire in the sheath instead of two.

To weld together two thermoplastic elements, such as a drum and lid, the drum and lid are clamped or held together with one or more of the heat sealing devices 10 interposed between them under compression such that the wider, flat surfaces of the wires confront the surfaces of the drum and lid to be welded together. Because the wires 10 are encapsulated in the sheath 12, they are less likely to shift due to expansion or other forces during the initial heating and compression process.

Electric leads are clipped to the wire ends and a predetermined electric current is passed through the resistance wires to generate heat therein. Connecting 110 volts AC across a fourteen foot length of 2 ohm-/foot wire for about ten minutes will raise the sheath temperature to about 300-400° F., which is sufficiently hot to melt the polyethylene. Different voltages, wire resistivities and polyethylene materials may require different time periods for application of electrical energy which can be determined by those skilled in the art in light of this specification. The compression between the drum and lid causes the sheath material to be squeezed or extruded horizontally so that the wires come in contact with the thermoplastic material of the drum and lid and thereby weld or thermally bond the thermoplastic drum and lid together. The electrical current source is then disconnected and the welded portion is allowed to cool.

Figure 2:
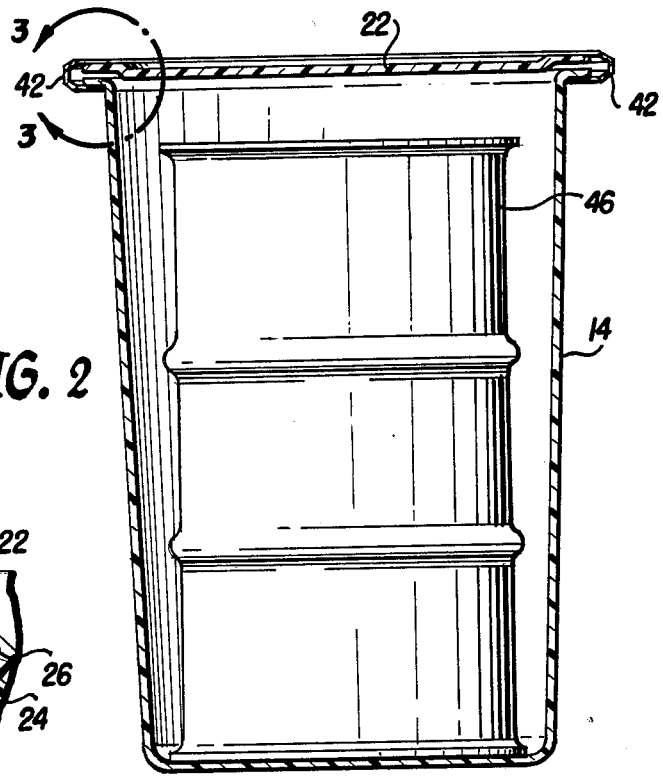
FIG. 2 is a cross-sectional view of a plastic drum and lid of the present invention with a metal drum therein.
Figure 3:
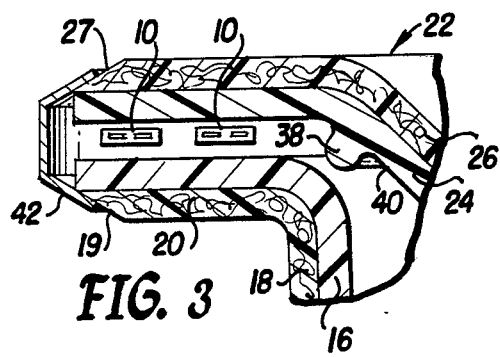
FIG. 3 is a detail cross-sectional view of the circled portion 3—3 of FIG. 2 prior to application of electrical current to the resistance wires.

The above-described device and method for welding plastic drums and lids together is especially suitable for plastic encapsulation drums for hazardous or low level nuclear waste disposal. In FIGS. 2 and 3, there is shown such an encapsulation drum 14, which comprises an inner layer 16 of polyethylene of about 0.125 inches thick, and an outer layer 18 of fiberglass, also about 0.125 inches thick. The means for bonding the polyethylene to the fiberglass are well known and are not considered a part of the invention. The drum has a flange or lip 20 extending horizontally from the top thereof. The drum walls are tapered to allow a plurality of drums to be stacked within one another. Preferably, the drum is a 90 gallon size so that a 55 gallon metal drum is easily contained therein.

A lid 22 designed to fit on the drum 14 is also shown in FIGS. 2 and 3. In a manner similar to the drum, the lid 22 is made from a 0.125 inch layer 24 of polyethylene bonded to a 0.125 inch layer 26 of fiberglass. A preferred lid 22 is designed with a recess in the center thereof, so that it fits within and is located by the drum flange 20. Alternatively, the lid 22 may be a substantially flat element made up of the layers 24, 26. The peripheral edges of both the drum and lid are beveled as shown at 19 and 27. A mating drum clamp 42 having a substantially V-shape in cross-section lids over the drum flange 20 and lid 22 so as to engage the beveled surfaces 19, 27.

The heat sealing devices 10 (two shown in FIG. 3) are attached to the underside of the outer peripheral edge of the lid 22 by heat welding the device to the lid surface, for instance, with a hand welding tool, or by any other suitable method. As those skilled in the art will appreciate, as the drum clamp 42 is tightened, i.e., drawn into a smaller diameter by bolt 44 (FIG. 4), the drum and lid will be urged together to place the heating devices 10 under compression between the drum flange 20 and lid 22.

Figure 5:
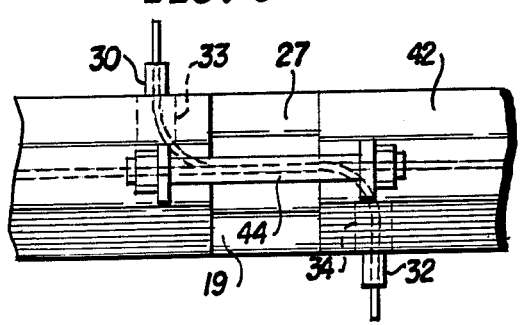
FIG. 5 is a detail view of the edge of the drum and lid showing the manner of terminating the ends of the encapsulated wires.

As best seen in FIG. 5, the ends 30, 32 of one of the sealing devices 10 extend through bores 33, 34 in the lid 22 and drum flange 20, respectively. The wires at each end 30, 32 of the sealing device 10 are electronically conductive means such as a shorting bar or by folding or twisting the wires together. The ends 30, 32 of the wires 11 are connected a source 36 of electricity by connecting them to conventional leads (not shown in detail). Preferably, the electric source 36 provides 110 volt AC current, although alternative embodiments may be designed to operate from other sources of electricity, such as a 12 volt DC car battery (FIG. 4) or generator.

An annular seal 38, preferably of polyethylene foam, is located on an inclined shoulder 40 formed in the lower surface of the lid adjacent, but interior to, the heat sealing device 10. If the lid 22 is flat, the seal would be located on the underside of the lid adjacent, but interiorly of the heat sealing device 10. The purpose of the seal 38 is to enhance the seal between the drum 14 and lid 22. This is particularly important if there are flammable materials being sealed within the drum, in that the seal 38 will prevent the flammable material from coming into contact with the weld area.

Hazardous and nuclear waste materials that are not reactive with polyethylene can be placed directly within the drum 14. However, if the waste materials will react with or corrode polyethylene, they can be first sealed within a cpnventional metal drum 46, which can be placed within the polyethylene/fiberglass drum 14.

After the waste materials have been placed in the drum 14, lid 22 is clamped in place by clamp 42 with the ends 30, 32 of wires 10 extending through the bores 33, 34 in the lid and drum. An electric current is applied to the wire ends 30, 32 as shown in FIG. 4. As current is applied to the resistance wires 11, the thermoplastic sheaths 12 begin to soften and melt. Pressure applied by the clamp 42 causes the sheath plastic to be squeezed or extruded radially inwardly and outwardly until the flat wires 11 intimately contact or at least are closely adjacent the inner layers 16, 24 of the drum flange 20 and drum lid, respectively. Pressure may be applied prior to the application of electrical energy to the wires 11 and/or during the application of electrical energy to the wires.

Figure 6:
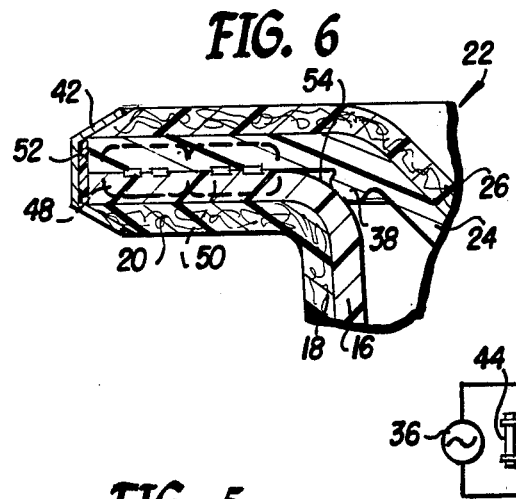
FIG. 6 is a detail cross-section similar to FIG. 3 showing the completed weld between the drum flange and lid.

As best seen in FIG. 6, continued application of current to the wires 11 will cause the adjacent plastic layers 16, 24 to melt, intermingle and become welded together over substantial areas 48, 50 between the lid and drum flange. Advantageously, the flat ribbon wires 11 provide a greater melt area between the drum and lid than would be possible with round wires having a corresponding cross-sectional area.

In addition, because of their greater surface area than equivalent area round wires, the flat wires 11 are less affected by gravity than round wires and thus tend to retain their location precisely at the interface between the plastic layers 16, 24 rather than sink into the plastic layer 16. Accordingly, a greater area and more uniform weld is possible with flat ribbon resistance wires rather than with round wires according to the present invention.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A method of welding a thermoplastic lid to a thermoplastic drum having a longitudinal axis to seal the contents of the drum therein comprising the steps of:

providing at least one resistance wire encapsulated in a thermoplastic sheath;

inserting said encapsulated wire between confronting surface of said lid and drum;

applying pressure to at least one of the lid and drum in a direction parallel to the drum axis so as to compress the encapsulated wire between said confronting surfaces;

passing a predetermined electrical current through said resistance wire to heat the wire and melt the thermoplastic sheath;

continuing said pressure applying step to squeeze the melted thermoplastic sheath material radially inwardly and outwardly and urge the confronting surfaces of the drum and lid in closer proximity to each other and to said wire; and;

melting at least a portion of the confronting surfaces of said drum and lid adjacent the resistance wire so as to intermingle the thermoplastic material of the drum with the thermoplastic material of the lid and thereby weld the drum and lid together at the confronting surfaces thereof.

2. The method according to claim 1, wherein said pressure applying step includes the step of urging the lid and drum together by means of opposing forces applied circumferentially to the drum and lid.

3. The method according to claim 1, wherein said pressure applying step includes the step of tightening a drum clamp circumferentially disposed about the lid and drum.

4. The method according to claim 1, wherein said pressure applying and current passing steps are performed sequentially.

5. The method according to claim 1, wherein at least a portion of said pressure applying and current passing steps are performed simultaneously.

6. The method according to claim 1, wherein said inserting step includes the steps of forming the encapsulated resistance wire into an annular ring and attaching the annular ring of encapsulated wire to the lid.

7. The method according to claim 6, wherein said attaching step includes the step of welding the thermoplastic sheath to the lid prior to passing any current through the wire.

8. The method according to claim 1, wherein said resistance wire comprises at least one flat ribbon resistance wire.

9. The method according to claim 8, wherein at least one flat ribbon resistance wire has a substantially rectangular cross-section with two planar sides of said wire forming the longer sides of said rectangular cross-section and two edges of said wire forming the shorter sides of said rectangular cross-section, said encapsulated wire being inserted between said confronting surfaces of said lid and drum with each of said planar sides of said wire confronting a respective one of the lid and drum and the thermoplastic sheath contacting the lid and drum, said encapsulated wire being disposed as an annular ring with the two planar surfaces of the wire in parallel relation to the confronting surfaces of the lid and drum and with one of the two edges of said wire being positioned at a first diameter of said annular ring and the other of the two edges of said wire being positioned at a second diameter of said annular ring greater than the first diameter.

10. The method according to claim 9, including a plurality of flat ribbon resistance wires disposed as said at least one flat ribbon resistance wire.

11. A method of welding a thermoplastic lid to a thermoplastic drum to seal the contents of the drum therein comprising the steps of:

providing at least one resistance wire encapsulated in a thermoplastic sheath;

inserting said encapsulated wire between confronting surfaces of said lid and drum;

applying pressure to at least one of the lid and drum so as to compress the encapsulated wire between said confronting surfaces; and during said pressure applying step, passing a predetermined electrical current through said resistance wire to heat the wire and melt the sheath while continuing said pressure applying step to squeeze the melted thermoplastic sheath radially inwardly and outwardly and urge the confronting surfaces of the drum and lid in closer proximity to each other and to said wire; and melting at least a portion of the confronting surfaces of said drum and lid adjacent the resistance wire so as to cause intermingling of the thermoplastic material of the drum and the thermoplastic material of the lid and thereby weld the drum and lid together.

12. The method according to claim 11, wherein said pressure applying step includes the step of urging the lid and drum together by means of opposing forces applied circumferentially to the drum and lid.

13. The method according to claim 11, wherein said pressure applying step includes the step of tightening a drum clamp circumferentially disposed about the lid and drum.

14. The method according to claim 11, wherein said pressure applying and current passing steps are performed sequentially.

15. The method according to claim 11, wherein at least a portion of said pressure applying and current passing steps are performed simultaneously.

16. The method according to claim 11, wherein said inserting step includes the steps of forming the encapsulated resistance wire into an annular ring and attaching the annular ring of encapsulated wire to the lid.

17. The method according to claim 16, wherein said attaching step includes the step of welding the thermoplastic sheath to the lid prior to passing any current through the wire.

18. The method according to claim 11, wherein said resistance wire comprises at least one flat ribbon resistance wire.

19. The method according to claim 18, wherein at least one flat ribbon resistance wire has a substantially rectangular cross-section with two planar sides of said wire forming the longer sides of said rectangular cross-section and two edges of said wire forming the shorter sides of said rectangular cross-section, said encapsulated wires being inserted between said confronting surfaces of said lid and drum with each of said planar sides of said wire confronting a respective one of the lid and drum and the thermoplastic sheath contacting the lid and drum, said encapsulated wire being disposed as an annular ring with the two planar surfaces of the wire in parallel relation to the confronting surfaces of the lid and drum with one of the two edges of said wire being positioned at a first diameter of said annular ring and the other of the two edges of said wire being positioned at a second diameter of said annular ring greater than the first diameter.

20. The method according to claim 19, including a plurality of flat ribbon resistance wires disposed as said at least one flat ribbon resistance wire.

* * * * *